United States Patent [19]

MacKenzie

[11] 4,034,442

[45] July 12, 1977

[54] APPARATUS FOR CLEANING FISH COLLARS

[75] Inventor: Gilbert Alexander MacKenzie, Vancouver, Canada

[73] Assignee: The Canadian Fishing Company Limited, Vancouver, Canada

[21] Appl. No.: 662,582

[22] Filed: Mar. 1, 1976

[51] Int. Cl.² .................................. A22C 25/00
[52] U.S. Cl. ..................................... 17/55; 17/57
[58] Field of Search .............. 17/55, 61, 63, 16, 46, 17/52, 45; 99/504

[56] References Cited

U.S. PATENT DOCUMENTS 3,380,114   4/1968   Härtl et al. ........................... 17/45

FOREIGN PATENT DOCUMENTS 1,164,016   10/1958   France .................................. 99/504

Primary Examiner—Robert Peshock
Attorney, Agent, or Firm—Fulwider, Patton, Rieber, Lee & Utecht

[57] ABSTRACT

An apparatus for cleaning fish collars. The apparatus comprises a plurality of holders, each dimensioned to receive a fish collar. At least one blade is on the exterior of each holder. The holder moves along a pathway. The apparatus also effects relative rotation of the collars and the blade, along at least a part of the pathway so that the blade can clean the received collar.

15 Claims, 5 Drawing Figures

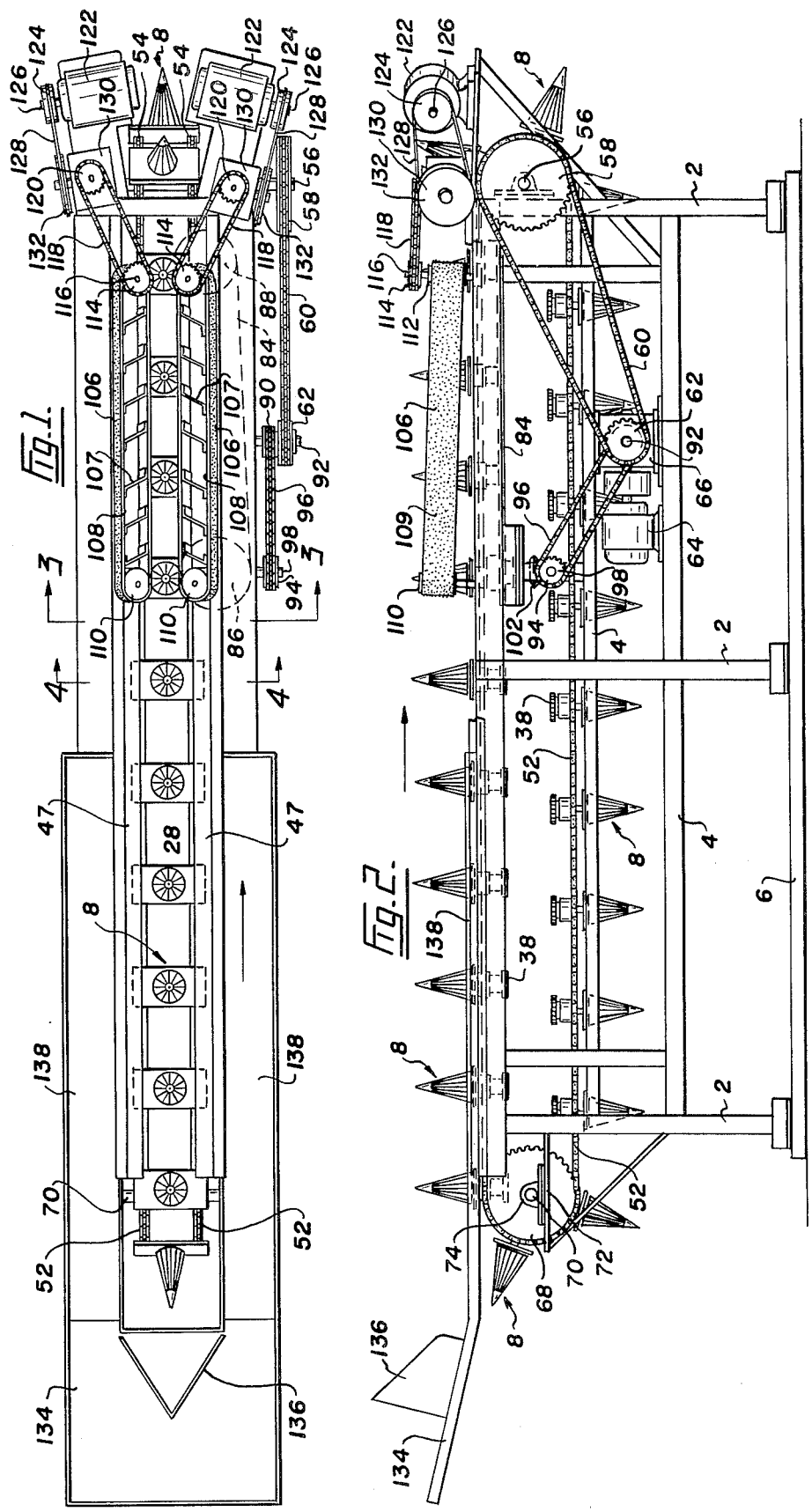

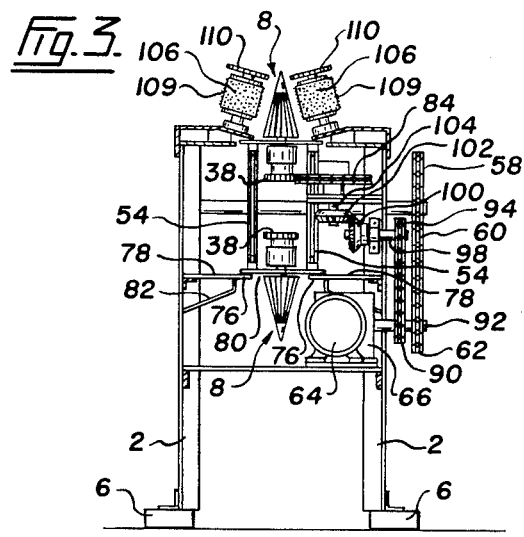

APPARATUS FOR CLEANING FISH COLLARS

FIELD OF THE INVENTION

This invention relates to an apparatus for cleaning fish collars.

DESCRIPTION OF PRIOR ART

In cleaning the fish for the canning process, particularly salmon, the head is removed by making a cut just behind the pectoral fin. A second cut is made just behind the gill to remove a piece of meat that is left attached to the head by the first cut. The second cut may be made after the first cut or simultaneously. A portion of the gut is attached to the piece of meat that is removed by the second cut. The material cut off in this manner is known as the fish collar.

The collar is a source of valuable meat and so it is cleaned and then used. It has been the unvarying practice of the prior art to clean the fish collar by hand using a knife to cut away the unwanted guts of the fish.

With increasing labor costs the cleaning of the collars by hand is undesirable. Accordingly the present invention seeks to provide an apparatus for cleaning fish collars that drastically reduces the amount of labor required in this task.

SUMMARY OF INVENTION

Accordingly, in its broadest aspect, the present invention is an apparatus for cleaning fish collars, the apparatus comprising a plurality of holders, each dimensioned to receive a fish collar, at least one blade on the exterior of each holder, means to move the holders along a pathway and means to effect relative rotation of the collars and the blade along at least a part of the pathway whereby the blade can clean the received collar.

In a preferred embodiment, the holder is conical, the narrow end of the cone being at the top. The collar to be cleaned is placed on the conical holder with the unwanted material attached.

It will be appreciated that the relative rotation of the collars and the blade means that the blade acts like a reamer, cutting out from the interior of the collar the unwanted material.

Desirably, each holder has a plurality of blades. In an embodiment that has been proved useful, each holder is provided with twelve blades.

In order to effect relative rotation of the collars and the blades, each holder may be rotatably mounted on a plate extending laterally of the pathway. First engagement means on each plate engage a first, endless chain to move the holder and the plate along the pathway. Second chain engagement means on each holder engage a second endless chain on at least said part of the path to rotate the holder.

The apparatus is also preferably provided with means to ensure that the holders rotate relative to the collar. In a preferred embodiment this means to ensure that the holders rotate relative to the collar is a means adapted to grip the exterior of each collar while the holder blade turns inside the collar. In particular the means adapted to grip the exterior of each collar may be a moving belt provided with spikes that engage the fish collar. These belts are preferably inclined at about 3° to move the collar downward on the holder as it passes through this area.

BRIEF DESCRIPTION OF DRAWINGS

An embodiment of the invention is illustrated, by way of example, in the accompanying drawings in which:

FIG. 1 is a plan view of an apparatus according to the invention;

FIG. 2 is a side elevation of the apparatus shown in FIG. 1;

FIG. 3 is a section along the line 3—3 of FIG. 1;

FIG. 4 is a section along the line 4—4 of FIG. 1; and

FIG. 5 is a section along the line 5—5 in FIG. 4.

DESCRIPTION OF A PREFERRED EMBODIMENT

The drawings show an apparatus for cleaning fish collars, the apparatus being mounted on a frame comprising uprights 2 and longitudinal members 4. The uprights are mounted on a concrete base 6.

The apparatus comprises a plurality of holders 8, each of which is dimensioned to receive a fish collar (not shown), generally a salmon collar. The holders 8 are illustrated somewhat generally in FIGS. 1 to 3 but a holder 8 is shown in more detail in FIGS. 4 and 5.

Referring to FIGS. 4 and 5 the holders 8 each comprise a conical hub 10 formed with a central bore 12. Blades 14, as most clearly indicated in FIG. 5, are mounted on the exterior of the conical hub 10. Each blade 14 has a cutting edge 16. The central bore 12 of the conical hub 10 is mounted on a shaft 18 provided at its uppermost end with a threaded recess 20. Recess 20 receives a stud 22 attached to a conical top piece 24. Thus the top piece 24 is located on the top of the conical hub 10. The top piece 24 simply provides a point to facilitate the pushing of the fish collar onto the blades 14 of the hub 10. Shaft 18 is provided with a peripheral flange 26 that acts as a stop for the conical hub 10.

As indicated most clearly in FIG. 1 each holder 8 is mounted on a plate 28. As shown in FIG. 4 this mounting is carried out by the provision of a hub 32, which is provided with a bush 36 and is secured to the plate 28 by bolts 30 extending through holes in the plate 28 and entering threaded recesses 34 in the hub 32. The shaft 18 passes through the bush 36 and is held in place by a collar 40 which is secured by locking screws (not shown). Hub 34 is provided with bush 36 to faciliate rotation of the shaft 18 within the hub 32. At its lower end each shaft 18 is provided with a 12 T.R.C60 sprocket 38 formed integral with the collar 40 so that it too may be fixed relative to the shaft 18 by the locking screws which screw into threaded holes (not shown) extending through the collar 38 to grip the shaft 18.

As indicated in FIG. 4, each plate 28 is provided with chain engaging links 42 on its underside. At its sides, each plate 28 is engaged in a channel 44 formed by a plate 46 extending transversely of the apparatus. A second plate 47 is spaced from plate 46 by spacer 48. Bolts 49 extend through clear holes in plates 46 and 47 and in spacer 48 to engage nuts 50. The engagement of the sides of the plates 28 in the channels 44 (which run the length of the machine as illustrated in FIG. 1) ensures that the holders move along a pathway on the upper surface of the machine defined by the channels 44.

The apparatus is provided with means to move the holders 8 along the pathway defined by the channel 44. In the illustrated embodiment the means to move the holders comprises endless R.C.60 chain 52 positioned to engage links 42 on the underside of each plate 28. As indicated in FIGS. 2 and 3 the endless chains 52 are driven by 45 T.R.C. 60 sprockets 54 which are mounted on a shaft 56. On one end of the shaft 56 a further 45 T.R.C. 60 sprocket 58 is driven by an endless chain 60. The chain 60 is engaged on a 35 T.R.C. 40 sprocket 62, which is driven by a ½ horsepower 1750 R.P.M. electric motor 64 through a 40:1 worm reducer 66.

At the end of the apparatus remote from the sprocket 58 the endless chains 52 pass over idling 45 T.R.C. 60 sprockets 68 mounted on a cross shaft 70. The end upright 2 is provided with a shelf 72 to receive journals 74 (only one of which is shown in FIG. 2) for the cross shaft 70.

Thus, under the influence of the driven sprockets 54, the endless chains 52 are driven in a direction indicated by the arrows in FIGS. 1 and 2 along the pathway defined by the channels 44. Upon passing around the driver sprockets 54 the holders 8 are returned along a lower part of the pathway which, as shown in FIG. 3, is defined by bearing areas 76 formed at the ends of cross pieces 78 each extending from each side of the machine to define a space 80 to permit passage of the holders 8. The cross pieces 78 are braced by plates 82.

The illustrated apparatus has means to effect relative rotation of the fish collars and the blades 14 of the holders 8. This rotation takes place along part of the pathway which is preferably adjacent one end of the machine as shown in the drawings. In the illustrated embodiment the means to effect relative rotation of the fish collars and the blades 14 is two-fold. First, the sprocket 38 at the base of each holder 8 is engaged by an endless R.C. 60 chain 84 and thus, while it is in contact with the chain 84 is caused to rotate. The endless chain 84 runs on a driven 35 T.R.C. 60 sprocket 86 and an idling 25 T.R.C. 60 sprocket 88 both shown in dotted outline in FIG. 1. Driven sprocket 86 is driven by the electric motor 64 from a 15 T.R.C. 50 sprocket 90 mounted, like the sprocket 62, on the drive shaft 92 of the worm reducer 66. Sprocket 90 rotates a 15 T.R.C. 50 sprocket 94 via a chain drive 96. Sprocket 94 is mounted on a shaft 98. A mitre gear 100 is mounted on the shaft 98. Mitre gear 100 engages with a second mitre gear 102 mounted on the lower end of a shaft 104. Driver sprocket 86 is mounted on the upper end of the shaft 104.

Engagement of the endless chain 84 with the sprockets 38 causes rotation of the shaft 18 and thus of each conical hub 10 as it passes on that part of the pathway between the driven sprocket and the idling sprocket 88.

On the same part of the pathway, that is upon that part of the pathway upon which the holders 8 are rotated by the action of the endless chain 84, there are provided two endless belts 106, one on each side of the pathway. The belts 106 are disposed substantially parallel to the inclined sides of the conical holders 8. In particular it can be noted in FIG. 1 that the belts 106 have their internal surfaces pressed against the collars when the collars are on the holders 8 by the spring members 107 located on a backing plate 108. Each endless belt 106 is provided with spikes 109 as shown in FIG. 3.

Each endless belt 106 is carried by an idling pulley 110 at one end and by a driven pulley 112 at its other end. Each pulley 112 is provided with a 22 T.R.C. 40 sprocket 114 on a shaft 116 that is attached to the driven pulley 112. An R.C. 40 chain 118 engages each sprocket 114. The chain 118 also engages a driven 22 T.R.C. 40 sprocket 120. Each sprocket 120 is driven by a ½ horsepower, 1750 R.P.M. electric motor 122 having a variable speed pulley 124 mounted on its outlet shaft 126. Each pulley 124 engages a belt 128 that drives a 10:1 worm reducer 130 via an 8 inch positive drive V-pulley 132 (see FIG. 2).

In a particular preferred embodiment the electric motors 122 are provided with a speed control. This means that the endless belts 106 can be made to move at a speed different from each other and from the holders 108.

At the inlet end of the machine, that is the end remote from the electric motors 122, the apparatus is provided with a receiving tray 134 onto which fish collars to be treated are placed. The fish collars are divided as they slip down the tray 134 by the divider 136 which directs the fish collars onto side trays 138. Normally the people operating the machine stand by the side trays 138.

Although not shown, it is desirable that at least that part of the machine having the endless belts 106 be provided with a water spray so that the parts cut out may be removed.

The machine is operated as follows. The collars to be cleaned are deposited on the tray 134. They slide down or are moved down by the operator to the side trays 138, past the divider 136.

The operator takes the collars and places one collar on each of a holder 8 as it passes through the area between the trays 138. The collars are placed on the holders 8. The part to be cut out may be upward or downward. The holders containing the collars then continue along the passageway in the direction of the arrows in FIGS. 1 and 2. When they reach the idler pulleys 110 two things take place. First the endless chain 84, moving on pulleys 86 and 88, engages the sprocket 38 at the base of each holder 8. This turns the holder 8. In the illustrated embodiment the turning is in an anti-clockwise direction as viewed in FIG. 1. Secondly the spikes 109 on the belts 106 engage the exterior of the collars on each holder. The belts 106, as indicated above, move alongside the holders at about the same rate of forward movement. The engagement of the spikes 109 in the collars thus prevents rotation of the collars while the driving force of the chain 84 turning the sprockets 38, and thus the holders 8, forces the blades 14 on the holders 8 to cut the interior of the collars to remove the undesirable internal parts of the fish.

It should be emphasized that in a particularly preferred embodiment the electric motors 122 are provided with a speed variation means, as well known on these motors. Thus, by varying the speed of a motor 122 one belt 106 can be made to move slower than the holders 8 and the other belt 106 can be made to move quicker. The differences in speed should be equal. That is if one belt 106 is X feet per second faster than the holders 8 then the other belt 106 should be X feet per second slower. The effect of this is to rotate the collars on the holders 8 as they pass that part of the passageway between the belts 106. Desirably the collars can be made to turn one complete rotation between the pulleys 110 and the pulleys 112. The principal reason for turning the collars in this way is to improve the cleaning of the collars. Belts 106 tend to crush the collars slightly and this crushing pushes the sides of the collars against blades 14 so that the parts in contact with belts 106 and knives 14 are cleaned more efficiently. It is therefor desirable that each part of the circumference of the collar be pressed by the belts 106 as the collars progress between the pulleys 110 and 112. The rotation is preferably in the same direction as the direction of rotation of the holders 8.

After the fish collars have been cleaned the holders 8 pass between the pulleys 112. As the holders 8 continue on their pathway they go around the sprockets 54 which causes the collars to fall off. The collars may then be collected in a container (not shown). The holders 8 continue along the pathway back to the sprocket 68.

A preferred embodiment of the invention has the above specific characteristics concerning sprockets and chain sizes and motor power. However, it will be appreciated that these specific characteristics can be varied.

Where necessary the component parts of the apparatus should be of stainless steel. Although not shown in the drawings the machine is generally provided with guards and protective grills in accordance with standard industrial practice.

The blades 14 are desirably produced of stainless steel, the cutting edge 16 is produced by grinding the face of the blades 14 at an angle of about 15°.

I claim:

1. An apparatus for cleaning fish collars, the apparatus comprising:
    a plurality of holders, each dimensioned to receive a fish collar;
    at least one blade on the exterior of each holder;
    means to move the holders along a pathway; and
    means to effect relative rotation of the collars and the blade, along at least a part of the pathway whereby the blade can clean the received collar.

2. An apparatus as claimed in claim 1 in which the holders are conical, the narrow end of the cone being at the top.

3. An apparatus as claimed in claim 1 in which each holder has a plurality of blades.

4. Apparatus as claimed in claim 3 in which each holder has 12 blades.

5. Apparatus as claimed in claim 1 in which each holder is rotatably mounted on a plate extending laterally of the pathway;
    first chain engagement means on each plate to engage a first, endless, driven chain to move the holders and the plates along the pathway;
    second chain engagement means on each holder to engage a second endless chain on at least said part of the path to rotate the holder; and
    means to ensure that the holders rotate relative to the collars.

6. Apparatus as claimed in claim 5 which is provided with open-sided channels to engage the sides of the plates to maintain the holders in the pathway.

7. Apparatus as claimed in claim 5 in which the means to ensure that the holders rotate relative to the collars include means adapted to grip the exterior of each collar while the holder blade turns inside the collar.

8. An apparatus as claimed in claim 7 in which the means adapted to grip the exterior of each collar is a moving belt provided with spikes that engage the fish collar.

9. Apparatus as claimed in claim 8 in which there are belts along each side of the pathway, the belt on one side of the pathway moving at a different speed from the belt on the other side, so that the collar is turned through about one complete revolution as it moves along said part of the pathway.

10. Apparatus as claimed in claim 9 including spring means to urge each belt against the fish collars.

11. Apparatus as claimed in claim 9 in which the belts are disposed parallel to the surfaces of the holders.

12. An apparatus for cleaning fish collars, the apparatus comprising:
    a plurality of conical holders, each dimensioned to receive a fish collar;
    blades on the exterior of each holder to clean the interior of the fish collars;
    means to move the holders along a pathway;
    means to rotate the holders on at least a part of the pathway;
    holding means, disposed substantially parallel to the holders on each side of said part of the pathway to grip the exterior of the fish collars as the holders rotate within the fish collars;
    the holding means on each side of said part of the pathway moving at a speed different from the holding means on the other side so that the collars are rotated through about 1 complete revolution, in a direction the same as the direction of rotation of the holders, during the movement along said part of the pathway.

13. Apparatus as claimed in claim 12 in which the holders are moved along by an endless chain moving on sprockets disposed at each end of the apparatus, at least one of said wheels for each chain being driven.

14. Apparatus as claimed in claim 12 in which the holders are provided with sprockets at their lower ends, and in which the apparatus has an endless, driven chain to engage the sprockets to rotate the holders durings their passage along said part of the pathway.

15. Apparatus as claimed in claim 12 in which the belts are moved at different relative speeds by an electric motor acting through a worm drive, each electric motor being provided with a speed control whereby the speed of each motor can be adjusted to effect the desired rotation of the collar.

* * * * *